US012638151B2

(12) United States Patent
Jha et al.

(10) Patent No.: US 12,638,151 B2
(45) Date of Patent: May 26, 2026

(54) EXTERIOR AIRCRAFT LIGHT, AIRCRAFT COMPRISING AN EXTERIOR AIRCRAFT LIGHT, AND METHOD OF MANUFACTURING AN EXTERIOR AIRCRAFT LIGHT

(71) Applicant: Goodrich Lighting Systems GmbH & Co. KG, Lippstadt (DE)

(72) Inventors: Anil Kumar Jha, Lippstadt (DE); Andre Hessling-von Heimendahl, Koblenz (DE); Marion Depta, Lippstadt (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 19/044,308

(22) Filed: Feb. 3, 2025

(65) Prior Publication Data

US 2025/0257858 A1 Aug. 14, 2025

(30) Foreign Application Priority Data

Feb. 13, 2024 (EP) .................................... 24157320

(51) Int. Cl.
*F21S 41/686* (2018.01)
*F21S 41/43* (2018.01)

(52) U.S. Cl.
CPC ............. *F21S 41/686* (2018.01); *F21S 41/43* (2018.01)

(58) Field of Classification Search
CPC .......... F21S 41/40; F21S 41/43; F21S 41/686; B64D 47/02; B64D 47/04; B64D 47/06
USPC .......................................................... 362/470
See application file for complete search history.

(56) References Cited

U.S. PATENT DOCUMENTS

| | | | | |
|---|---|---|---|---|
| 6,296,378 | B1 * | 10/2001 | Doyen | B64C 27/52 362/390 |
| 9,327,843 | B2 | 5/2016 | Jha et al. | |
| 11,479,366 | B2 | 10/2022 | Hessling-Von Heimendahl et al. | |
| 11,542,034 | B2 * | 1/2023 | Jha | F21V 23/0442 |
| 2008/0137353 | A1 | 6/2008 | Larsen et al. | |
| 2011/0122635 | A1 * | 5/2011 | Calvin | B64D 47/06 362/470 |
| 2014/0328074 | A1 | 11/2014 | Jha et al. | |
| 2016/0195239 | A1 | 7/2016 | Jha et al. | |
| 2019/0016030 | A1 | 1/2019 | Baumann | |

FOREIGN PATENT DOCUMENTS

| | | |
|---|---|---|
| FR | 600874 | 2/1926 |
| GB | 1117812 | 6/1968 |

OTHER PUBLICATIONS

European Patent Office, European Search Report dated Jul. 9, 2024 in Application No. 24157320.3.

* cited by examiner

*Primary Examiner* — Thomas M Sember
(74) *Attorney, Agent, or Firm* — SNELL & WILMER L.L.P.

(57) ABSTRACT

An exterior aircraft light comprises: a base structure; at least one light source for emitting light providing a preliminary light output, wherein the at least one light source is arranged on the base structure; and a shutter arrangement for forming a light output of the exterior aircraft light by partially blocking the preliminary light output. The shutter arrangement is coupled to the base structure via a pivoting mechanism. When arranged in different pivoting positions, the shutter arrangement blocks different portions of the preliminary light output.

20 Claims, 10 Drawing Sheets

EXTERIOR AIRCRAFT LIGHT, AIRCRAFT COMPRISING AN EXTERIOR AIRCRAFT LIGHT, AND METHOD OF MANUFACTURING AN EXTERIOR AIRCRAFT LIGHT

CROSS-REFERENCE TO RELATED APPLICATIONS

This application claims priority to EP Patent Application 24157320.3, filed Feb. 13, 2024 and titled "EXTERIOR AIRCRAFT LIGHT, AIRCRAFT COMPRISING AN EXTERIOR AIRCRAFT LIGHT, AND METHOD OF MANUFACTURING AN EXTERIOR AIRCRAFT LIGHT," which is incorporated by reference herein in its entirety for all purposes

FIELD

The present invention is in the field of aircraft lighting, in particular in the field of exterior aircraft lighting. More particularly, the present invention is in the field of aircraft navigation lights and aircraft anti-collision lights. The present invention is further related to aircraft comprising at least one exterior aircraft light, and to a method of manufacturing an exterior aircraft light.

BACKGROUND

Modern aircraft have a vast range of aircraft lights, including a variety of exterior aircraft lights, such as aircraft headlights, aircraft navigation lights, aircraft anti-collision lights, etc.

Some exterior aircraft lights, for example navigation lights and anti-collision lights, are configured for providing light outputs having well defined spatial light emission characteristics with respect to the aircraft. Forward navigation lights, for example, typically have a horizontal opening angle of 110°; and tail navigation lights typically have a horizontal opening angle of 140°.

The light outputs of navigation lights and anti-collision lights are also typically oriented in a predefined orientation with respect to the longitudinal axis of the aircraft. In consequence, the design of such exterior aircraft lights depends on the position and on the orientation, in which the respective exterior aircraft light is mounted to the aircraft. Thus, conventionally, exterior aircraft lights of different designs need to be provided for different mounting positions and for different mounting orientations at the aircraft. Administrative and logistical handling of a variety of different exterior aircraft lights is challenging in development and series production, since many individual drawings, models, hardware-components, tools, and fixtures must be organized and maintained.

In consequence, it would be beneficial to provide an exterior aircraft light, in particular an aircraft navigation light and/or an aircraft anti-collision light, whose design may allow for an easy adaptation to different mounting positions and/or to different mounting orientations at an aircraft.

SUMMARY

Exemplary embodiments of the invention include an exterior aircraft light, which is configured for being mounted to an exterior of an aircraft and which comprises: a base structure; at least one light source for emitting light that provides a preliminary light output, wherein the at least one light source is arranged on the base structure; and a shutter arrangement for forming a light output of the exterior aircraft light by partially blocking the preliminary light output. The shutter arrangement is coupled to the base structure via a pivoting mechanism. The pivoting mechanism allows the shutter arrangement to move, in particular to pivot, with respect to the base structure. The shutter arrangement is configured for blocking different portions of the preliminary light output, when it is arranged in different pivoting positions. The shutter arrangement may be fixable to the base structure in a desired position for preventing further movement of the shutter arrangement.

The shutter arrangement may, in particular, be movable between at least two different positions for selectively forming one of at least two different light outputs of the exterior aircraft light. Generally, the shutter arrangement may be movable between different discrete positions or may be movable in a continuous manner. The expression of the shutter arrangement being movable means that the shutter arrangement as a whole may be movable or that one or more individual shutter elements may be movable. In the former case, the shutter arrangement as a whole may be movable between different discrete positions or may be movable in a continuous manner. In the latter case, the one or more shutter elements may be movable between different discrete positions or may be movable in a continuous manner. In either case, it can be said that the shutter arrangement may assume at least two different positions.

An exterior aircraft light according to an exemplary embodiment of the invention has a design that may allow for adjusting the light output, in particular the direction of the light output, provided by the exterior aircraft light, by moving the shutter arrangement between at least two different positions. The moving of the shutter arrangement and the adjusting of the light output may take place during the production of the exterior aircraft light or during the assembly of the exterior aircraft light to the aircraft. The expression of the shutter arrangement being movable means that the exterior aircraft light has a design that allows the shutter arrangement to assume different positions. When the exterior aircraft light is in its operating state/final operating configuration, the shutter arrangement may no longer be movable. With the shutter arrangement being coupled to the base structure via a pivoting mechanism, exterior aircraft lights of the same basic design. just with the shutter arrangement being in different positions, may be mounted to different positions and in different spatial orientations to an aircraft, while still providing the same "global" light output, i.e. while still providing a highly similar or even the same light output with respect to the aircraft. In other words, when viewed from outside the aircraft, the light outputs provided by exterior aircraft lights with the same basic design, but different positions of the shutter arrangement may be highly similar or even the same, regardless of the individual mounting position and the individual mounting orientation of the respective exterior aircraft lights.

An exterior aircraft light according to an exemplary embodiment of the invention has a design that may further allow for an easy adaptation to different types of aircraft. In consequence, the number of different types of exterior aircraft lights, which need to be produced for equipping differing types of aircraft with exterior lights, may be reduced. As a result, the costs for manufacturing, storing and delivering the exterior aircraft lights may be reduced as well.

In an embodiment, the exterior aircraft light further comprises an optical system, which is arranged for forming the preliminary light output from the light emitted by the at least one light source. The optical system may in particular be configured for forming a preliminary light output having a large preliminary opening angle in at least one cross-sectional plane. Further in particular, the preliminary light output may have a large preliminary opening angle in a horizontal plane or in a plane that is oriented nearly horizontally, when the exterior aircraft light is mounted to an aircraft. A large preliminary opening angle may allow for adapting the light output of the exterior aircraft light over a large angular range by pivoting the shutter arrangement. The optical system may in particular be configured for forming a preliminary light output having a preliminary opening angle of at least 180° in at least one cross-sectional plane. A preliminary opening angle of at least 180° may allow, for example, for providing a light output having an opening angle of 110°, wherein the light output may be pivoted over a range of at least 70°.

In an embodiment, the base structure of the exterior aircraft light provides support for the at least one light source and for the optical system. This may result in a particularly compact design of the exterior aircraft light.

In an embodiment, the at least one light source comprises or is at least one LED. LEDs provide efficient, reliable and durable light sources, which are available at low costs.

In an embodiment, the at least one light source is arranged on a circuit board. The circuit board may comprise one or more electrical paths for supplying electric power to the at least one light source. In addition to the at least one light source, further electric components, which may in particular include semiconductor components, may be arranged on the circuit board for supplying electric power to the at least one light source and/or for controlling the operation of the at least one light source.

In an embodiment, the circuit board may be arranged on and/or mounted to the base structure. The circuit board may in particular be arranged on an end surface of the base structure. In an embodiment, the circuit board may be formed as an integral part of the base structure.

In an embodiment, the shutter arrangement comprises at least two shutter elements. The shutter arrangement may in particular comprise exactly two shutter elements or exactly three shutter elements. At least one opening may be formed between the shutter elements for allowing light, which is output from the optical system, to pass through.

In such an embodiment, the spatial orientation of the opening, and in consequence, the spatial orientation of the light output of the exterior aircraft light, may be adjusted by moving the at least two shutter elements. Providing the shutter arrangement with a plurality of shutter elements may allow for reducing the total space that is occupied by the shutter arrangement.

In an embodiment, the at least two shutter elements are arranged in fixed relative positions with respect to each other, so that they are pivotable/movable only in combination and synchronously with each other. In such an embodiment, the opening angle of the light output of the exterior aircraft light is fixed, even when the shutter elements are moved. In such an embodiment, the shutter arrangement of the exterior aircraft light has only a single degree of freedom. This may provide for a particularly convenient setting of the desired light output of the exterior aircraft light. It may also allow for a comparably simple design and/or production of the shutter arrangement.

In an embodiment, the at least two shutter elements are pivotable/movable independently of each other. A shutter arrangement, in which the at least two shutter elements are movable independently of each other, provides additional degrees of freedom for adjusting the light output of the exterior aircraft light. Such a shutter arrangement may in particular allow for adjusting not only the direction, but also the opening angle of the light output of the exterior aircraft light.

A shutter arrangement, in which the at least two shutter elements are movable independently of each other, may further allow for reducing the size of the exterior aircraft light, as compared to a configuration in which shutter elements are arranged in fixed relative positions with respect to each other. Providing the shutter arrangement with individually movable shutter elements may further allow for optimizing the thermal path, which is provided for dissipating the heat generated by the at least one light source in operation.

In an embodiment, the shutter arrangement comprises at least one visor-shaped shutter element. In an embodiment, the plurality of shutter elements may comprise or may be a plurality of visor-shaped shutter elements. Visor-shaped shutter elements have been found as very suitable for providing adjustable shutter elements. Visor-shaped shutter elements may be pivoted easily between at least two different positions for providing different light outputs.

In an embodiment, the shutter elements are supported by two hinge pins, which are arranged on opposite sides of the base structure. The shutter elements may also be supported on a pivoting rod. The pivoting rod may extend through the base structure and may allow each shutter element to pivot around the pivoting rod.

In an embodiment, at least one of the shutter elements is provided with holes or eyes, in particular with two holes or two eyes, which are formed on opposite lateral support portions of the shutter element. The holes or eyes may be configured for receiving the hinge pins or the pivoting rod, respectively, for pivotably supporting the shutter element.

The hinge pins and/or the pivoting rod may define a pivot axis. In an embodiment, the at least one light source is arranged on said pivot axis. Alternatively, the at least one light source may be arranged at a position, which is offset from the pivot axis. The at least one light source may in particular be arranged at a position, which is located above or below the pivot axis.

When the exterior aircraft light is mounted to an aircraft, the pivot axis may extend in a vertical direction or in a substantially vertical direction. The shutter arrangement may be pivotable in a horizontal plane/in a substantially horizontal plane, which is oriented perpendicular/substantially perpendicular to the pivot axis.

In an embodiment, the shutter arrangement is pivotable over a pivot range of at least 70°. This may allow for adjusting the direction of the light output of the exterior aircraft light over a range of at least 70°.

In an embodiment, the light output of the exterior aircraft light, which is defined by the plurality of shutter elements, has an opening angle in the range of between 110° and 150° C., in particular an opening angle in the range of between 110° and 130°. Aircraft navigation lights and white strobe anti-collision lights often have an opening angle in the range of between 110° and 150° C. In particular, forward aircraft navigation lights and white strobe anti-collision lights often have an opening angle in the range of between 110° and 130°.

The light output of an exterior aircraft light according to an exemplary embodiment of the invention may in particular have an opening angle of about 110°, which is a typical opening angle of a forward navigation light. Alternatively, the light output of an exterior aircraft light according to an exemplary embodiment of the invention may have an opening angle of about 140°, which is a typical opening angle of a tail navigation light.

If the exterior aircraft light is a white strobe anti-collision light, it may have an opening angle of about 120°. The same split as for navigation lights may be possible as well.

When an exterior aircraft light according to an exemplary embodiment of the invention is mounted to an aircraft, the above mentioned opening angle of the light output of the exterior aircraft light is defined as the opening angle of the light output emitted by the exterior aircraft light, as it is seen from outside the aircraft light, within a horizontal plane extending through the exterior aircraft light.

The light output of an exterior aircraft light according to an exemplary embodiment of the invention does not need to have sharp boundaries. The intensity of the light output is usually required to exceed a predefined threshold/a predefined set of thresholds within said opening angle. Additionally, portions of light, in particular portions of light having a comparably very low intensity, may be emitted into regions outside said opening angle.

The details of the required light emission characteristics of exterior aircraft lights are defined in various standards. For example, the Federal Aviation Regulations (FAR) standard contains specifications for airplane navigation lights in FAR 25.1385-25.1397, specifications for rotorcraft navigation lights in FAR 27.1385-27.1397, specifications for airplane anti-collision lights in FAR 25.1401, and specifications for rotorcraft anti-collision lights in FAR 27.1401. Exterior aircraft lights according to exemplary embodiments of the invention may be designed to fulfill these requirements.

In a plane, which is oriented perpendicular to the pivot axis of the shutter arrangement, the preliminary light output, as provided by the at least one light source and, if present, by the optical system of the exterior aircraft light, may have a preliminary opening angle. When the exterior aircraft light is mounted to an aircraft, said plane may be a horizontal plane or a plane, which is oriented nearly horizontally.

In an embodiment, the preliminary light output has a preliminary opening angle of at least 180° within said plane. Such a preliminary opening angle may allow for adapting the light output of the exterior aircraft light over a large angular range by pivoting the shutter arrangement around the pivot axis. A preliminary opening angle of at least 180° may allow, for example, for providing a light output having an opening angle of 110°, wherein the light output may be pivoted over a range of at least 70°.

In an embodiment, the optical system comprises a lens arrangement for forming the preliminary light output. For forming the preliminary light output, the lens arrangement may comprise a plurality of collimating lens elements. A lens arrangement, in particular a lens arrangement comprising a plurality of collimating lens elements, may allow for forming a preliminary light output having a large preliminary opening angle, in particular a preliminary opening angle of at least 180°. This may allow for pivoting the light output of the exterior aircraft light over a large angular range.

In an embodiment, the lens arrangement comprises multiple separate lenses. A lens arrangement comprising multiple separate lenses may be very flexible and may be adjusted for providing different preliminary light outputs by replacing at least one of the multiple lenses.

In an embodiment, the lens arrangement comprises an integrated lens structure including multiple different lens surfaces. An integrated lens structure may allow for providing a particularly compact lens arrangement, which is easy to produce at relatively low costs.

The lens arrangement may comprise parabolic lens elements and/or non-parabolic lens elements.

The lens elements of the lens arrangement do not have to collimate the light in a strict sense. Instead, it is sufficient that the lens elements are configured for directing the light, which is emitted by the at least one light source, into desired light output regions.

In an embodiment, the optical system is, at least partly, formed of silicone and/or formed by over-molding.

In an embodiment, the exterior aircraft light further comprises a fixing mechanism. The fixing mechanism may allow for fixing the shutter arrangement in position with respect to the base structure. This fixing may avoid undesired movements of the shutter arrangement, after it has been moved into a position that results in a desired light output of the exterior aircraft light. The fixing mechanism may be designed so that it allows for moving the shutter arrangement with respect to the base structure when a certain force, which exceeds a predefined threshold, is applied to the shutter arrangement.

In an embodiment, the fixing mechanism comprises a ratching mechanism. The ratching mechanism may include a first set of teeth and a second set of teeth, which are, at least partially, in engagement with each other for fixing the shutter arrangement with respect to the base structure. The first set of teeth may be provided on the shutter arrangement, in particular on a shutter element thereof, and the second set of teeth may be provided on the base structure and/or on a hinge pin/pivoting rod, as described above. There may be a first set of teeth and a second set of teeth for each shutter element.

The fixing mechanism may also be a magnetic fixing mechanism. A magnetic fixing mechanism may include a first magnet and a second magnet, or a magnet and a piece of metal, which are held in a fixed position with respect to each other by the magnetic forces of the at least one magnet. The magnet(s) may, in particular, be permanent magnet(s). The first magnet may be provided on the shutter arrangement, in particular on a shutter element thereof, and the second magnet may be provided on the base structure. There may be a first magnet and a second magnet, or a magnet and a piece of metal, for each shutter element.

In an embodiment, the fixing mechanism comprises a mechanical coupling mechanism including at least one bolt and/or at least one pin and/or at least one screw, which may be applied to the shutter arrangement for fixing the position of the shutter arrangement with respect to the base structure. There may be at least one bolt and/or at least one pin and/or at least one screw for each shutter element.

In an embodiment, the fixing mechanism comprises a frictional fixing mechanism, including at least one frictional surface, which is configured for generating a frictional force for fixing the position of the shutter arrangement with respect to the base structure. There may be at least one frictional surface for each shutter element.

In an embodiment, the position of the shutter arrangement is fixed with respect to the base structure by employing an adhesive. In particular, the shutter arrangement may be glued in position with respect to the hinge pin(s)/pivoting rod. It is possible that each shutter element is glued in position separately.

In an embodiment, the position of the shutter arrangement is fixed with respect to the base structure by welding or by fusing the shutter arrangement to the base structure, or to a support structure provided at the base structure, after the shutter arrangement has been moved into the desired position. In particular, the shutter arrangement may be welded/fused to the hinge pin(s)/pivoting rod. It is possible that each shutter element is welded/fused to the base structure separately.

In an embodiment, the exterior aircraft light is a white strobe anti-collision light for emitting a white strobe anti-collision light output having an opening angle in the horizontal plane of between 110° and 150°, in particular an opening angle in the horizontal plane of between 115° and 125°, more particularly an opening angle in the horizontal plane of about 120°.

In an embodiment, the exterior aircraft light is a red beacon anti-collision light for emitting a red beacon anti-collision light output having an opening angle in the horizontal plane of between 110° and 150°, in particular an opening angle in the horizontal plane of between 115° and 125°, more particularly an opening angle in the horizontal plane of about 120°.

In an embodiment, the exterior aircraft light is an aircraft navigation light emitting a navigation light output having an opening angle in the horizontal plane of between 110° and 150°. The exterior aircraft light may in particular be a forward navigation light having a navigation light opening angle in the horizontal plane of approximately 110°; or a tail navigation light having a navigation light opening angle in the horizontal plane of approximately 140°. A forward navigation light may be a port side navigation light emitting light having red color. A forward navigation light may also be a starboard navigation light emitting light having green color. If the exterior aircraft light is a tail navigation light, it may emit white light.

In an embodiment, the exterior aircraft light comprises a single light source. In an embodiment, the exterior aircraft light comprises a plurality of light sources emitting light of the same color. The color may, in particular, be one of red or green or white.

In an embodiment, the exterior aircraft light comprises a plurality of light sources. The plurality of light sources may emit light of the same color, or light of at least two different colors. The at least two different colors may include, in particular, at least two colors selected from red, green, and white. The plurality of light sources may include at least one red light source and at least one green light source, or may include at least one red light source and at least one white light source, or may include at least one green light source and at least one white light source, or may include at least one red light source and at least one green light source and at least one white light source.

A navigation light comprising a plurality light sources, which are configured for emitting light having different colors, may be selectively operated as a starboard navigation light, as a port side navigation light, or as a tail navigation light by selectively operating the light source(s) to emit light of the respectively desired color. In combination with a movable shutter arrangement, such an exterior aircraft light is a very flexible multi-color navigation light, which may, in particular, have only a single part number, but which may be selectively employed as one of the red and green forward navigation lights and as a tail navigation light in a plurality of different aircraft. In addition/alternatively, the exterior aircraft light with the movable shutter arrangement may be employed as a white strobe anti-collision light and/or as a red beacon anti-collision light in a plurality of different aircraft.

Exemplary embodiments of the invention further include a method of manufacturing an exterior aircraft light, wherein the method comprises: arranging at least one light source on a base structure for providing a preliminary light output from light, which is emitted by the at least one light source in operation; coupling a shutter arrangement, which blocks a portion of the preliminary light output provided by the optical system in operation, to the base structure via a pivoting mechanism; and bringing the shutter arrangement into an operating position relative to the base structure via the pivoting mechanism.

Bringing the shutter arrangement into an operating position relative to the base structure via the pivoting mechanism may in particular include moving the shutter arrangement into one of the at least two different shutter positions for causing the exterior aircraft light to emit a light output into a spatial sector, which is defined by the respective shutter position.

The shutter arrangement may be brought into the operating position before or after the exterior aircraft light is mounted to an aircraft. The shutter arrangement may, in particular, be brought into the operating position at the factory, in which the exterior aircraft light is produced. As a result, the respective exterior aircraft light may be delivered as an exterior aircraft light providing a fixed light output, which has been set by moving the shutter arrangement into the selected operating position.

In an embodiment, the method further includes arranging an optical system over the at least one light source for forming the preliminary light output from the light emitted by the at least one light source.

In an embodiment, the method further includes fixing the shutter arrangement in its operating position. This may prevent undesired movement of the shutter arrangement, which may result in an erroneous light output of the exterior aircraft light.

Fixing the shutter arrangement may in particular include permanently fixing the shutter arrangement in its operating position.

The additional features, modifications and effects, as described above with respect to the exterior aircraft light, apply to the method of manufacturing an exterior aircraft light in an analogous manner.

Exemplary embodiments of the invention further include an aircraft, such as an airplane or a helicopter, which is equipped with at least one exterior aircraft light according to an exemplary embodiment of the invention. The additional features, modifications and effects, as described above with respect to the exterior aircraft light and/or with respect to the method of manufacturing an exterior aircraft light, apply to the aircraft in an analogous manner.

In an aircraft according to an exemplary embodiment of the invention, the at least one exterior aircraft light may be mounted to a fuselage of the aircraft or to a wing of the aircraft. The at least one exterior aircraft light may, in particular, be mounted to a wing root of the aircraft or to a wing tip of the aircraft or to a tail portion of the fuselage of the aircraft.

The wing, to which an aircraft according to an exemplary embodiment of the invention may be mounted, may be a main wing of an airplane, i.e. a wing that provides a large portion of the lift for the airplane. The wing may also be an ancillary wing, such as horizontal stabilizer. In some airplanes and helicopters, the aircraft navigation lights may be arranged at the wing tips of the horizontal stabilizers of the aircraft.

BRIEF DESCRIPTION OF THE DRAWINGS

Further exemplary embodiments of the invention are described in the following with respect to the accompanying drawings, wherein.

DETAILED DESCRIPTION

Figure 1:
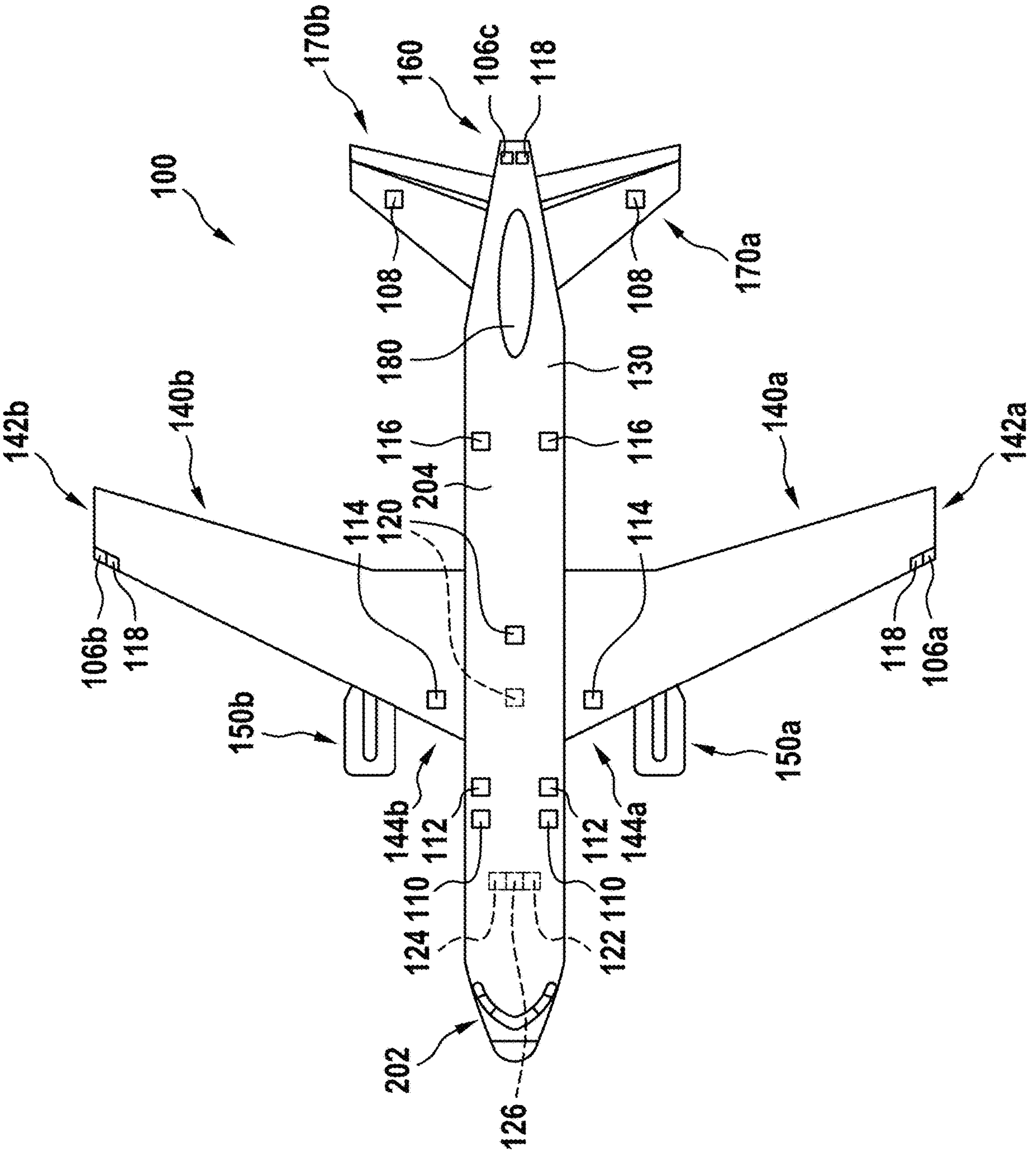
FIG. 1 depicts a schematic top view of an aircraft according to an exemplary embodiment of the invention, which is equipped with a variety of exterior aircraft lights.

FIG. 1 shows a top view of an aircraft 100 according to an exemplary embodiment of the invention. The aircraft 100 is an airplane, comprising a fuselage 130, which houses a cockpit 202 and a passenger cabin 204, and two wings 140*a*, 140*b*, extending from the fuselage 130. Two horizontal stabilizers 170*a*, 170*b* and a vertical stabilizer 180 extend from a rear portion of the fuselage 130. A respective engine 150*a*, 150*b* is mounted to each of the wings 140*a*, 140*b*.

The aircraft 100 depicted in FIG. 1 is equipped with a wide variety of exterior lights. In particular, the aircraft 100 is equipped with three navigation lights 106*a*-106*c*, two logo lights 108, two wing scan lights 110, two engine scan lights 112, two runway turn-off lights 114, two cargo loading lights 116, three white strobe anti-collision lights 118, two red-flashing anti-collision beacon lights 120, a landing light 122, a take-off light 124, and a taxi light 126. It is pointed out that these kinds of lights and their numbers are exemplary only and that the aircraft 100 may be equipped with additional lights that are not shown in FIG. 1.

A port side navigation light 106*a*, emitting light having red color, is arranged at the wing tip 142*a* of the left wing 140*a*. A starboard navigation light 106*b*, emitting light having green color, is arranged at the wing tip 142*b* of the right wing 140*b*. A tail navigation light 106*c*, emitting light having white color, is positioned at the tail 160 of the aircraft 100.

The different colors of the light outputs, as emitted by the different navigation lights 106*a*-106*c*, indicate to the aircraft environment if they are looking at the port side, at the starboard side or at the tail side of the aircraft 100. The navigation lights 106*a*-106*c* are normally activated during all phases of the flight and in all flight conditions.

The logo lights 108 are directed to the vertical stabilizer 180 of the aircraft 100 and are provided for illuminating the same, in particular for illuminating the logo commonly provided on the vertical stabilizer 180. The logo lights 108 are normally switched on for the entire duration of the flight during night flights. It is also possible that the logo lights are only used during taxiing on the airport and are normally switched off during the flight.

The wing scan lights 110 and the engine scan lights 112 are positioned on the left and right sides of the fuselage 130, in front of the roots 144*a*, 144*b* of the wings 140*a*, 140*b* of the aircraft 100. The wing scan lights 110 and the engine scan lights 112 are normally off during the flight and may be switched on periodically or upon reasonable cause by the pilots or by the aircrew, in order to check the wings 140*a*, 140*b* and the engines 150*a*, 150*b* of the aircraft 100.

The runway turn-off lights 114 are positioned in the roots 144*a*, 144*b* of the wings 140*a*, 140*b*. The runway turn-off lights 114 are directed forwards and are normally switched off during the flight and switched on during taxiing, at least at night.

The cargo loading lights 116 are positioned on the left and right sides of the fuselage 130, behind the wings 140*a*, 140*b* and in front of the tail structure of the aircraft 100. They are normally switched off during the flight of the aircraft 100.

The white strobe anti-collision lights 118 are positioned in the left and right wing tips 142*a*, 142*b* as well as at the tail 160 of the aircraft 100. During normal operation of the aircraft 100, the white strobe anti-collision lights 118 emit respective sequences of white light flashes. It is also possible that the white strobe anti-collision lights 118 are only operated during night and in bad weather conditions.

The red-flashing anti-collision beacon lights 120 are positioned on the top and the bottom of the fuselage 130 of the aircraft 100. They are arranged at the height of the wings in the longitudinal direction of the aircraft 100. While one of the red-flashing anti-collision beacon lights 120 is disposed on the top of the fuselage 130, the other one of the red-flashing anti-collision beacon lights 120 is disposed on the bottom of the fuselage 130 and is therefore shown in phantom in FIG. 1. The red-flashing anti-collision beacon lights 120 are normally switched on during taxiing and during take-off and landing. Their output is perceived as a sequence of red light flashes in a given viewing direction. In alternative configurations, three red-flashing anti-collision beacon lights may be provided alongside or integrated with the white strobe anti-collision lights 118.

In the embodiment depicted in FIG. 1, the runway turn-off lights 114 are located in the wings 140*a*, 140*b*, in particular in the roots 144*a*, 144*b* of the wings 140*a*, 140*b*, and the landing light 122, the take-off light 124 and the taxi light 126 are mounted to the front gear 135 of the aircraft 100. The front gear 135 is stored within the fuselage 130 of the aircraft 100 during flight, and it is deployed during landing, taxiing and take off.

In alternative embodiments, which are not explicitly shown in the figures, the runway turn-off lights 114 may be mounted to the front gear 135 and/or at least one of the landing light 122, the take-off light 124 and the taxi light 126 may be installed in the wings 140*a*, 140*b*, in particular in the roots 144*a*, 144*b* of the wings 140*a*, 140*b*, of the aircraft 100.

The aircraft 100 may also comprise one or more multi-functional lights, which combine(s) the functionalities of at least two of a landing light, a take-off light, a taxi light, a runway turn-off light, a navigation light, a white strobe anti-collision light, and a red-flashing beacon light.

Since the landing light 122, the take-off light 124, and the taxi light 126 are arranged on the bottom of the aircraft 100, they are also depicted in phantom in FIG. 1.

Any one or any subset or all of the three navigation lights 106*a-c* and the three white strobe anti-collision lights 118 may be exterior aircraft lights in accordance with exemplary embodiments of the invention. In addition/alternatively, in case red-flashing anti-collision beacon lights are provided alongside or integrated with the white strobe anti-collision lights 118, any one or any subset or all of these red-flashing anti-collision beacon lights may be exterior aircraft lights in accordance with exemplary embodiments of the invention.

Figure 2:
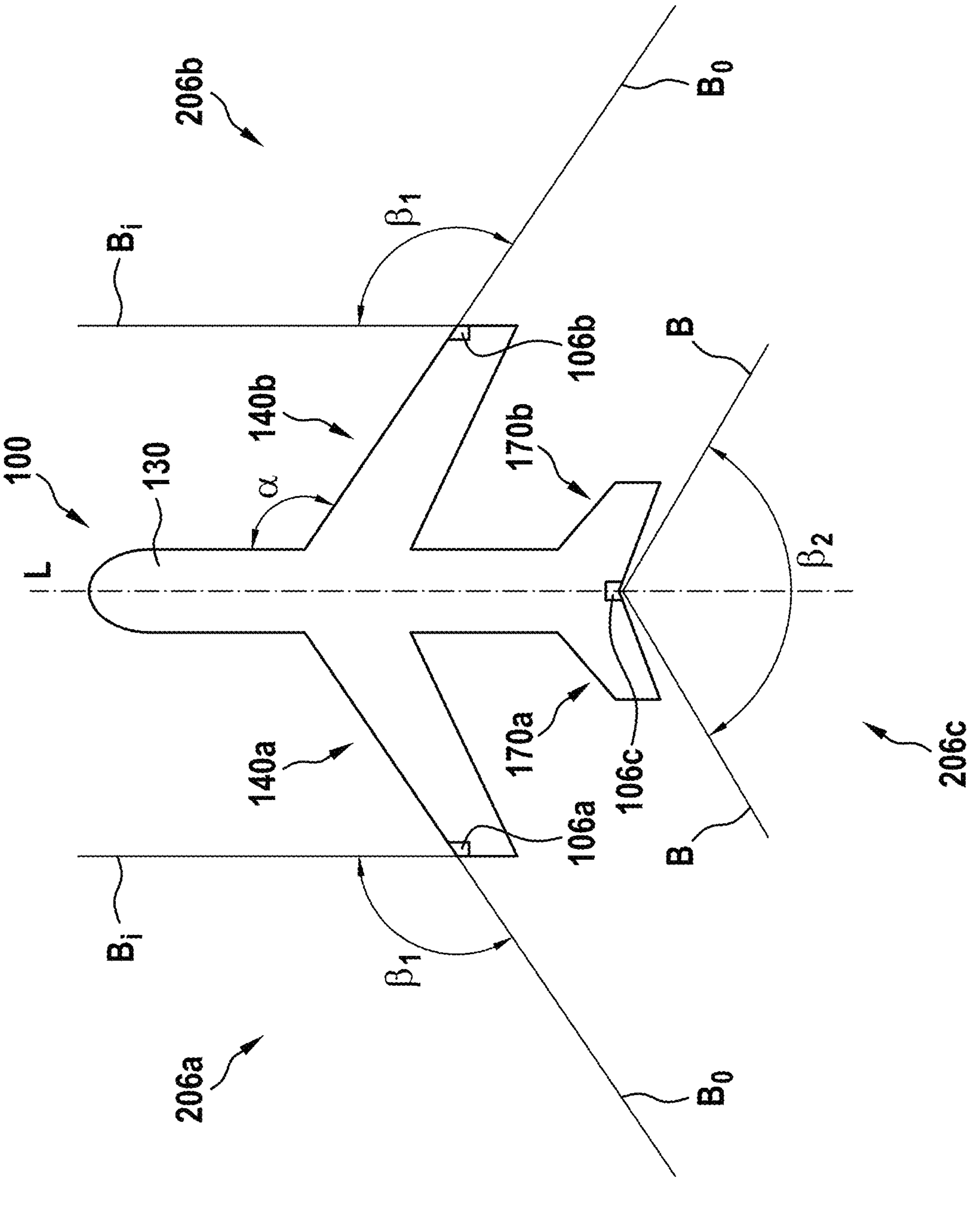
FIG. 2 depicts a schematic top view of an aircraft according to an exemplary embodiment of the invention, which is equipped with three navigation lights.

FIG. 2 shows a schematic top view of an aircraft 100 according to an exemplary embodiment of the invention, which is equipped with three navigation lights 106*a*-106*c*, in particular with a port side navigation light 106*a*, with a starboard navigation light 106*b*, and with a tail navigation light 106*c*. Any one or any subset or all of the three navigation lights 106*a-c* may be exterior aircraft lights in accordance with exemplary embodiments of the invention. The aircraft 100 may be equipped with further exterior aircraft lights, as shown in FIG. 1, which are not depicted in FIG. 2.

The light emission characteristics of the three navigation lights 106*a*-106*c* are schematically illustrated in FIG. 2.

The port side navigation light 106*a* and the starboard navigation light 106*b* emit light outputs 206*a*, 206*b* having, in a horizontal plane comprising or extending basically parallel to the wings 140*a*, 140*b* of the aircraft 100, an opening angle β1 of approximately 110°, respectively. The inner boundaries Bi of the light outputs 206*a*, 206*b* emitted by the port side navigation light 106*a* and the starboard navigation light 106*b*, which are facing the fuselage 130 of the aircraft 100, are oriented basically parallel to the longitudinal axis L of the aircraft 100.

The tail navigation light 106*c* emits a white light output 206*c* having, within the above mentioned horizontal plane, an opening angle β2 of approximately 140°. The white light output 206*c* is basically mirror-symmetric with respect to the longitudinal axis L of the aircraft 100.

Although definite boundaries B, Bi, Bo of the light outputs 206*a*-206*c* are depicted in FIG. 2, these definite boundaries B, Bi, Bo are depicted only for illustrative purposes. In reality, the intensity of the light outputs 206*a*-206*c* must exceed a predefined threshold within the area defined by said boundaries B, Bi, Bo. In addition, a portion of light, in particular a portion of light having a considerably lower light intensity, may be emitted into regions beyond the boundaries B, Bi, Bo depicted in FIG. 2.

Details of the required light emission characteristics of exterior aircraft lights are for example set in the FAR standard, in particular in FAR 25.1385-25.1397/FAR 27.1385-27.1397 for exemplary navigation light outputs 206*a*-206*c* and in FAR 25.1401/27.1401 for exemplary light outputs of anti-collision lights. Exterior aircraft lights 2 according to exemplary embodiments of the invention may be designed so that they fulfill these requirements and/or other requirements, as set by different standards and/or as set by aircraft design goals.

In order to produce the required navigation light outputs 206*a*-206*c*, the navigation light output 206*a*-206*c* of each of the navigation lights 106*a*-106*c* is adjusted to the mounting position and to the mounting orientation of the respective navigation light 106*a*-106*c*.

Figure 3A:
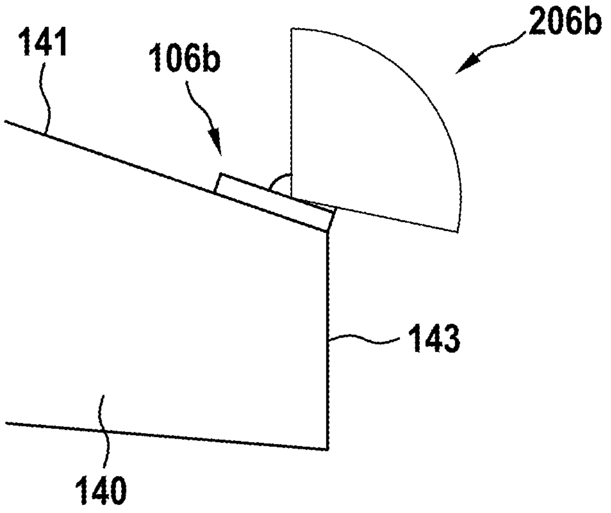
FIG. 3A depicts a schematic view of starboard navigation light according to an exemplary embodiment of the invention, mounted to a front edge of a starboard wing of an aircraft.
Figure 3B:
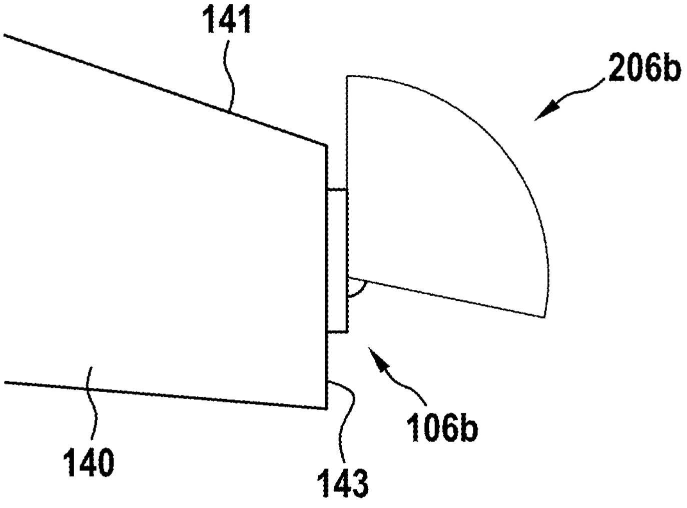
FIG. 3B depicts a schematic view of starboard navigation light according to an exemplary embodiment of the invention, mounted to a lateral outer edge of a starboard wing of an aircraft.

This is schematically illustrated in FIGS. 3A and 3B for the example of a starboard navigation light 106*b* according to an exemplary embodiment of the invention. FIGS. 3A and 3B show respective schematic top views of a right wing tip 142*b* of an aircraft 100 (not shown) and a starboard navigation light 106*b*, which is mounted to said wing tip 142*b*.

In FIG. 3A, the starboard navigation light 106*b* is mounted to a front edge 141 of the right wing tip 142*b*. In FIG. 3B, the starboard navigation light 106*b* is mounted to a lateral outer edge 143 of the right wing tip 142*b*.

In order to provide the required starboard navigation light output 206*b*, as it is depicted in FIG. 2, in each of the different configurations depicted in FIGS. 3A and 3B, the starboard navigation lights 106*b* shown in FIGS. 3A and 3B are set up differently. In particular, the starboard navigation light 106*b* shown in FIG. 3A, which is mounted to a front edge 141 of the right wing tip 142*b*, is set up differently than the starboard navigation light 106*b* shown in FIG. 3B, which is mounted to a lateral outer edge 143 of the right wing tip 142*b*.

In case of conventional navigation lights, having pre-defined fixed light emission characteristics, two different types of starboard navigation lights 106*b* need to be provided for being mounted to the front edge 141 and to the lateral outer edge 143 of the right wing tip 142*b*, respectively.

Further, the angle α of the wings 140*a*, 140*b* with respect to the longitudinal axis L of the aircraft 100 (see FIG. 2), which may also be denoted as "rake angle α", may vary between different types of aircraft 100. The rake angle α may in particular vary between 20° and 90°.

Figure 4:
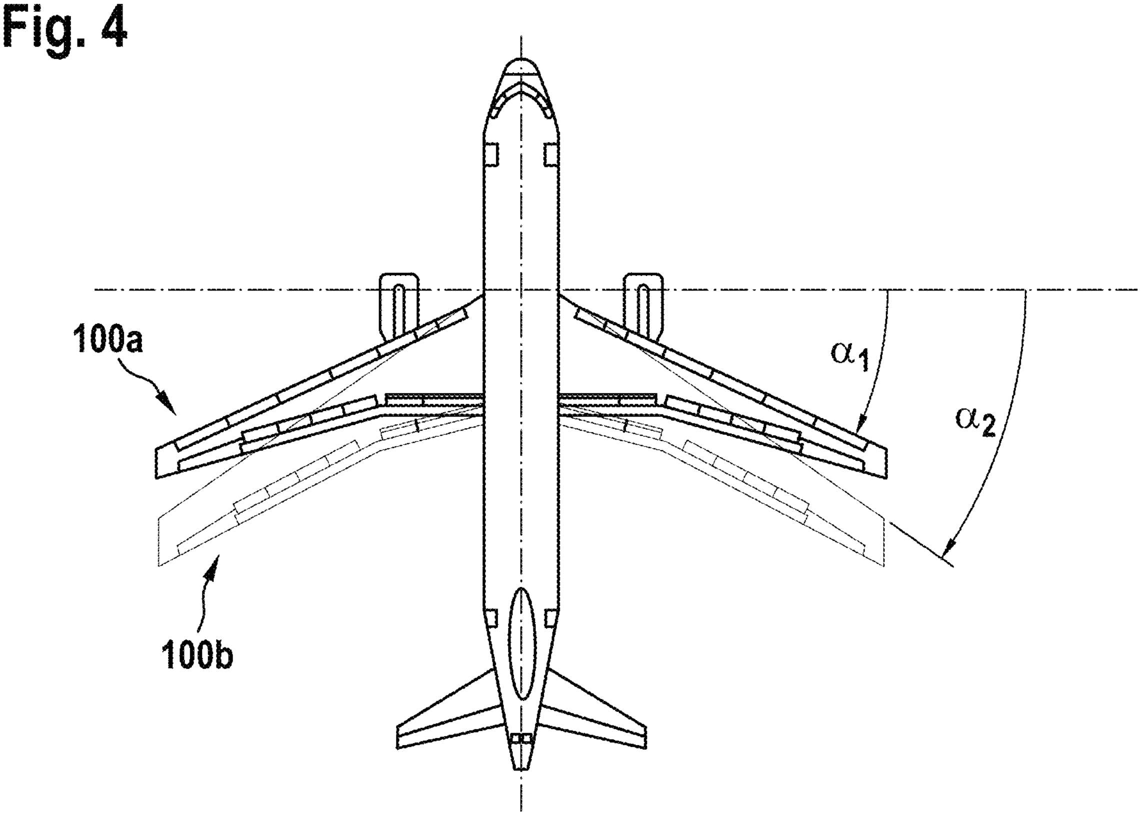
FIG. 4 depicts two different types of aircraft, in which the wings are mounted to the fuselage of the aircraft in two different rake angles.

This is schematically illustrated in FIG. 4 for two different types of aircraft 100*a*, 100*b*. An aircraft 100*a* of a first type may, for example, have a rake angle α1 of 25°, and an aircraft 100*b* of a second type may, for example, have a rake angle α2 of 35°. In consequence, different types of conventional port side navigation lights 106*a* and different types of conventional starboard navigation lights 106*b* need to be employed in each of these two types of aircraft 100*a*, 100*b*, respectively.

With exterior aircraft lights in accordance with exemplary embodiments of the invention, the different mounting positions/orientations, as illustrated in FIG. 3, and the different rake angles of the aircraft wings, as illustrated in FIG. 4, may be accounted for with a single basic design and an adaptation of the shutter arrangement for a particular application scenario. This will be described in detail with respect to the ensuing Figures.

Figure 5A:
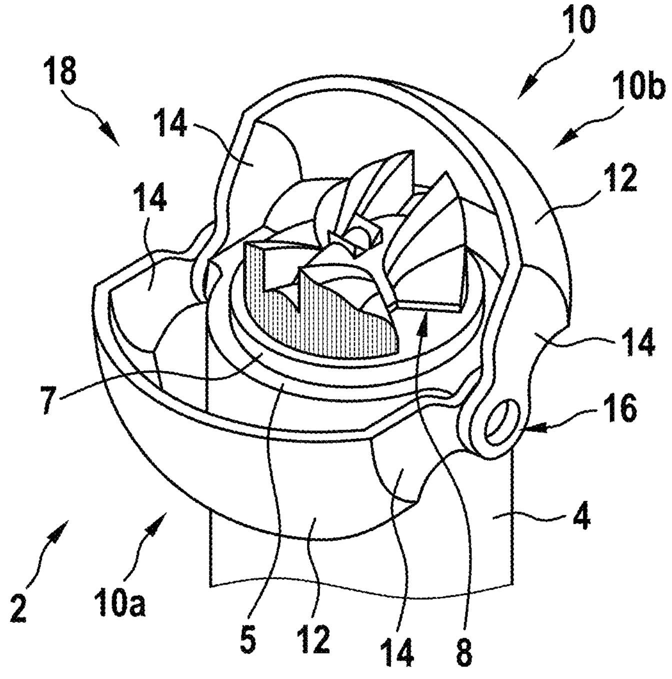
FIG. 5A depicts a perspective view of an exterior aircraft light according to an exemplary embodiment of the invention.

FIG. 5A depicts a perspective view of an exterior aircraft light 2 according to an exemplary embodiment of the invention. The exterior aircraft light 2 is usable as an aircraft navigation light and its design allows for adjusting the navigation light output 206*a*-206*c* emitted by the exterior aircraft light 2, in order to allow for adapting the navigation light output 206*a*-206*c* of the exterior aircraft light 2 to different types of aircraft 100*a*, 100*b*. The exterior aircraft light 2 may in particular allow for adjusting the navigation light output 206*a*-206*c*, which is emitted by the exterior aircraft light 2, to different types of aircraft 100*a*, 100*b* having different rake angles α1, α2 and/or to different mounting positions of the exterior aircraft light 2 at the aircraft 100, as schematically illustrated in FIGS. 3A and 3B.

The exterior aircraft light 2 depicted in FIG. 5A comprises a base structure 4, which is configured for being mounted to an aircraft 100, and an optical system 8, which is arranged on and supported by the base structure 4. The exterior aircraft light 2 further comprises at least one light source 6, in particular at least one LED, which is arranged on the base structure 4, for emitting light in operation.

In FIG. 5A, the at least one light source 6 is not visible, as it is completely covered by the optical system 8. The at least one light source 6 is visible in the cross-sectional views of the exterior aircraft light 2 depicted in FIGS. 6A and 6B, which will be discussed in more detail further below.

The at least one light source 6 may be arranged on a circuit board 7. The circuit board 7 may be arranged on and supported by the base structure 4. The circuit board 7 may in particular be arranged on an upper surface 5 of the base structure 4. Alternatively, the circuit board 7 may be part of base structure 4. The circuit board 7 may, in particular, be formed integrally with the base structure 4.

The circuit board 7 may comprise electrical paths, which are not shown in the figures, for supplying electric power to the at least one light source 6. Electric components (not shown), which may in particular include semiconductor components, may be arranged on the circuit board 7 for supplying electric power to the at least one light source 6 and/or for controlling the operation of the at least one light source 6.

The optical system 8 is configured for forming a preliminary light output from the light emitted by the at least one light source 6, when it is operated.

The optical system 8 is optional. Exemplary embodiments of the invention may also include exterior aircraft lights 2, which do not comprise an optical system 8. In exterior aircraft lights 2 that do not comprise an optical system 8, the preliminary light output is the light output emitted by the at least one light source 6.

The exterior aircraft light 2 further comprises a shutter arrangement 10, which is configured for forming a navigation light output 206*a*-206*c* of the exterior aircraft light 2 by partially blocking the preliminary light output provided by the optical system 8.

In the exemplary embodiment depicted in FIG. 5A, the shutter arrangement 10 comprises two shutter elements 10*a*, 10*b*.

Figure 5B:
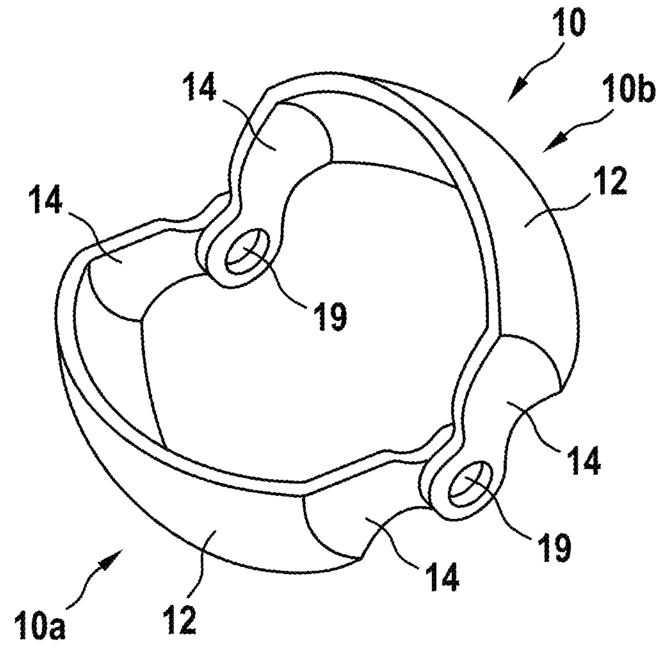
FIG. 5B depicts a shutter arrangement of an exterior aircraft light according to an exemplary embodiment of the invention comprising two shutter elements.

FIG. 5B depicts the shutter arrangement 10, comprising the two shutter elements 10*a*, 10*b*, in a perspective view, without showing the other components of the exterior aircraft light 2.

Figure 5C:
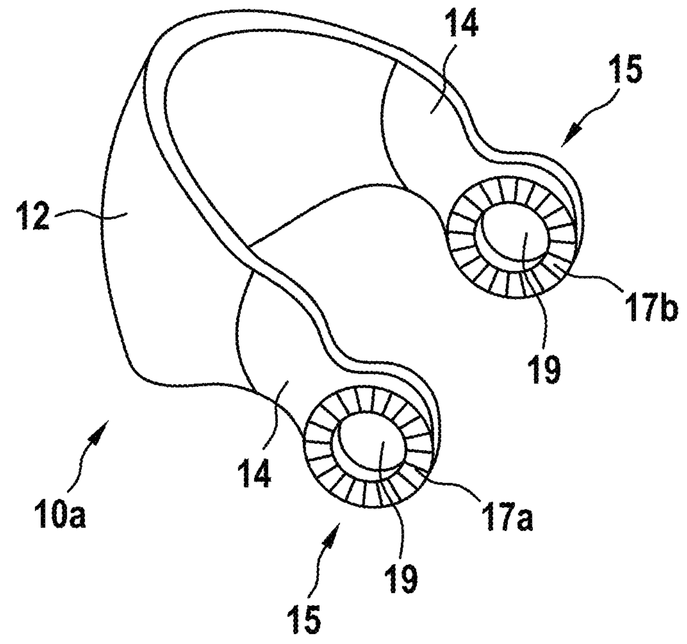
FIG. 5C depicts an individual shutter element.

FIG. 5C depicts an individual shutter element 10*a* in a perspective view.

Each of the shutter elements 10*a*, 10*b* may have a shape that is similar to the shape of a visor of a helmet, for example a motorcycle helmet. Each of the two shutter elements 10*a*, 10*b* may, in particular, comprise an arcuate central portion 12, which is opaque for blocking a portion of the preliminary light output, and two lateral connecting portions 14, for pivotably supporting the central portion 12 at two fulcrums 16, provided at the base structure 4.

The fulcrums 16 may include two hinge pins, which are arranged on opposite sides of the base structure 4. The fulcrums 16 may also be provided by a pivoting rod (not shown) that extends through the base structure 4.

Holes or eyes 19 may be formed within the lateral connecting portions 14 of the shutter elements 10*a*, 10*b* for receiving the hinge pins or the pivoting rod, respectively, thereby forming a pivoting mechanism, pivotably supporting the respective shutter element 10*a*, 10*b*.

The pivoting mechanism allows for pivoting the two shutter elements 10*a*, 10*b* around a pivot axis P extending between the two fulcrums 16. The pivot axis P may extend parallel to the upper surface 5 of the base structure 4. When the exterior aircraft light 2 is mounted to an aircraft 100, the pivot axis P extends vertically, or basically vertically, in particular at an angle in the range of between 85° and 95° with respect to the horizontal.

As a result, the shutter arrangement 10 is coupled to the base structure 4 via a pivoting mechanism, which allows for positioning the shutter elements 10*a*, 10*b* of the shutter arrangement 10 in different positions with respect to the optical system 8. When positioned in different positions, the shutter arrangement 10 blocks different portions of the preliminary light output, which results in different navigation light outputs 206*a*-206*c* being emitted by the exterior aircraft light 2.

During the manufacturing of an exterior aircraft light 2 according to an exemplary embodiment of the invention, the shutter arrangement 10 is movable between at least two different shutter positions. This allows for selectively forming one of at least two different navigation light outputs 206*a*-206*c* of the exterior aircraft light 2.

In other words, by moving, in particular by pivoting, the shutter elements 10*a*, 10*b* of the shutter arrangement 10 between at least two different shutter positions, the navigation light output 206*a*-206*c*, which is emitted by the exterior aircraft light 2, may be adapted to one of at least two different types of aircraft 100*a*, 100*b* (cf. FIG. 4) and/or to one of at least two different mounting positions of the exterior aircraft light 2 at said aircraft 100 (cf. FIGS. 3A and 3B).

After the shutter elements 10*a*, 10*b* of the shutter arrangement 10 have been moved into a desired shutter position for providing a desired light output, the shutter arrangement 10 may be fixed in said shutter position. By moving the shutter arrangement 10 into a desired shutter position and fixing the shutter arrangement 10 in said shutter position, the exterior aircraft light 2 is configured for being mounted to a specific type of aircraft 100*a*, 100*b* at a specific mounting position.

The exterior aircraft light 2 may comprise a fixing mechanism 15 for fixing the shutter elements 10*a*, 10*b* in the desired position with respect to the base structure 4. The fixing mechanism 15 may be designed so that it allows for moving the shutter elements 10*a*, 10*b* with respect to the base structure 4, when a certain force, which exceeds a predefined threshold, is applied to the shutter elements 10*a*, 10*b*.

The fixing mechanism 15 may, for example comprise a ratching mechanism. The ratching mechanism may comprise engaging portions (see FIG. 5C), which may be formed at the lateral connecting portions 14 of the shutter elements 10*a*, 10*b*.

Each engaging portion may be in contact with another engaging portion, formed on the base structure 4, and/or with an engaging portion formed on another shutter element 10*a*, 10*b*. Said engaging portions may include a first, outer set of teeth 17*a* and/or a second, inner set of teeth 17*b*. When the shutter elements 10*a*, 10*b* are mounted to the base structure 4, as it is depicted in FIG. 5A, these teeth 17*a*, 17*b* engage, at least partially, with each other or with corresponding teeth (not shown), which are formed on the peripheral surface of the base structure 4.

Alternatively or additionally, the fixing mechanism 15 may comprise a magnetic fixing mechanism, including a first magnet and a second magnet, or a magnet and a piece of metal, which are held in a fixed position with respect to each other by magnetic forces. The magnets may, in particular, be permanent magnets.

Alternatively or additionally, the fixing mechanism 15 may comprise a mechanic coupling mechanism including at least one bolt and/or at least pin and/or at least one screw (not shown), which may be applied to the shutter arrangement 10 for fixing the position of the shutter arrangement 10 with respect to the base structure 4.

Alternatively or additionally, the fixing mechanism 15 may comprise a frictional fixing mechanism including at least one frictional surface configured for generating a frictional force for fixing the position of the shutter arrangement 10 with respect to the base structure 4.

Alternatively or additionally, the position of the shutter arrangement 10 may be fixed with respect to the base structure 4 by employing an adhesive, and/or by welding or fusing the shutter arrangement 10 to the base structure 4 in the desired position.

Exterior aircraft lights 2 according to exemplary embodiments of the invention may comprise a single shutter element, two shutter elements 10*a*, 10*b*, as depicted in FIGS. 5A, 5B, 6A, 6B, three shutter elements, or more than three shutter elements.

In case the shutter arrangement 10 comprises at least two shutter elements 10*a*, 10*b*, the at least two shutter elements 10*a*, 10*b* may have fixed relative positions with respect to each other so that they are movable only in combination and synchronously with each other.

In further embodiments, the shutter elements 10*a*, 10*b* may be movable independently of each other as long as they have not been fixed in their final positions.

In case the shutter arrangement 10 comprises at least three shutter elements, the shutter arrangement 10 may comprise at least two groups of shutter elements. In such a configuration, the shutter elements of each group may be movable only in combination with each other, and the different groups of shutter elements may be movable independently of each other.

At least one opening 18 is formed between the shutter elements 10*a*, 10*b*, allowing a portion of the preliminary light output, which is generated by the optical system 8, to pass through the at least one opening 18 for providing the navigation light output 206*a*-206*c* of the exterior aircraft light 2.

Figure 6A:
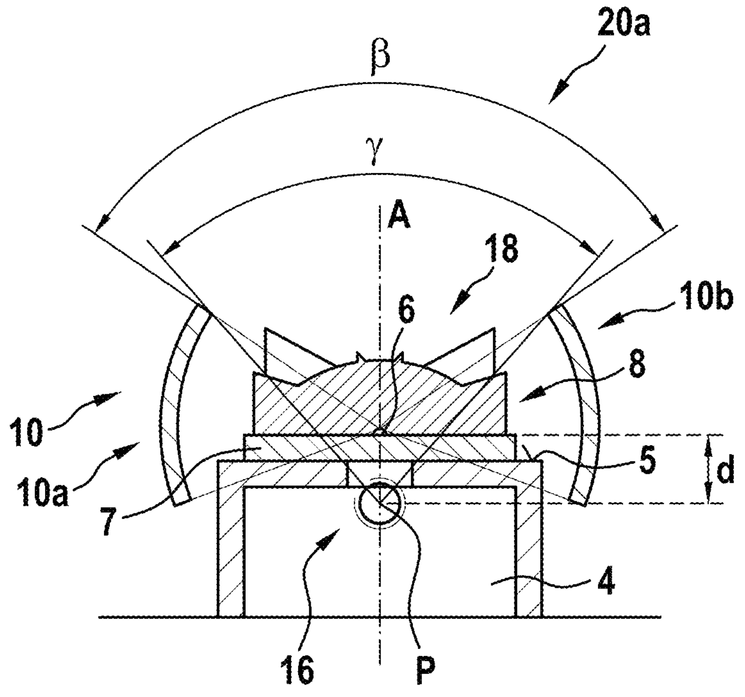
FIG. 6A depicts a cross-sectional view of the exterior aircraft light depicted in FIG. 5A, with the shutter arrangement being arranged in a first position.
Figure 6B:
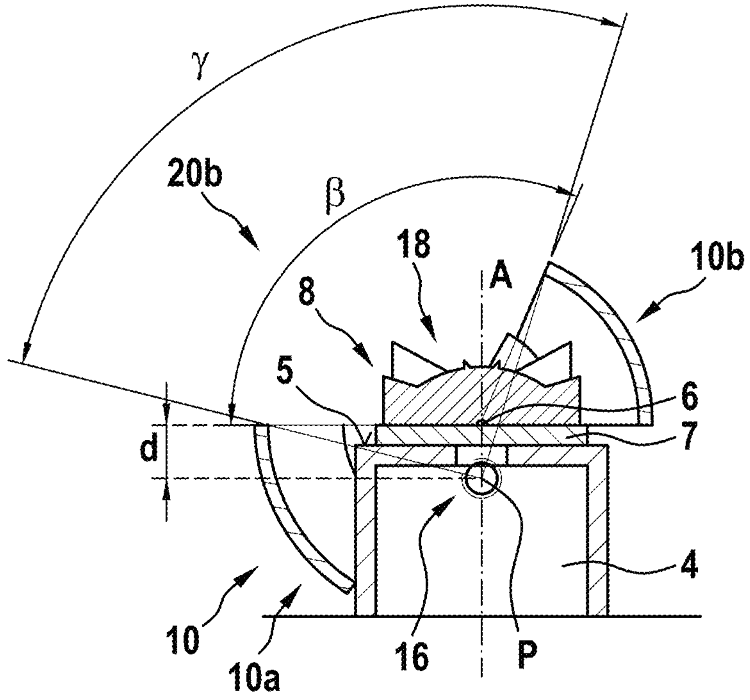
FIG. 6B depicts a cross-sectional view of the exterior aircraft light depicted in FIG. 5A, with the shutter arrangement being arranged in a second position.

FIGS. 6A and 6B depict respective cross-sectional views of the exterior aircraft light 2, depicted in FIG. 5A, with the shutter arrangement 10 being arranged in two different positions.

In the configuration depicted in FIG. 6A, the shutter arrangement 10 is arranged in a central position, which is symmetric with respect to a center plane A of the exterior aircraft light 2. In consequence, the opening 18 of the shutter arrangement 10 is arranged in a central position as well. When arranged in said central position, the opening 18 of the shutter arrangement 10 is also symmetric with respect to the center plane A of the exterior aircraft light 2. This configuration results in the exterior aircraft light 2 emitting a first light output 20*a*, which is symmetric with respect to the center plane A.

In FIG. 6B, the shutter arrangement 10 is arranged in a non-central position, in particular in a left position. This position of the shutter arrangement 10 results in a second light output 20*b*, which is pivoted to the left with respect to the first light output 20*a*, depicted in FIG. 6A.

In a further configuration, which is not explicitly depicted in the figures, the shutter arrangement 10 may be pivoted to the right, resulting in a third light output, which is pivoted to the right with respect to the first light output 20*a*, depicted in FIG. 6A.

The shutter arrangement 10 may also be pivoted into intermediate positions, in which the shutter arrangement 10 is arranged in a position between the central position depicted in FIG. 6A and the left position depicted in FIG. 6B or between the central position depicted in FIG. 6A and the right position (not explicitly shown).

In the embodiment depicted in FIGS. 5A, 6A and 6B, the at least one light source 6 of the exterior aircraft light 2 is not arranged on the pivot axis P of the shutter arrangement 10, i.e. not arranged on the axis P extending between the two fulcrums 16. Instead, the light source 6 is arranged in some distance d above said pivot axis P. With said shift, the opening angle β of the light outputs 20*a*, 20*b*, emitted by the exterior aircraft light 2, differs from the opening angle γ of the opening 18 of the shutter arrangement 10.

In the embodiment depicted in FIGS. 5A, 6A, and 6B, the opening angle γ of the opening 18 formed within the shutter arrangement 10 is 83°, resulting in an opening angle β of the light outputs 20*a*, 20*b* of 110°. This relation between the opening angle γ of the opening 18 of the shutter arrangement 10 and the opening angle β of the light outputs 20*a*, 20*b* emitted by the exterior aircraft light 2 is, however, only exemplary, as it depends on the geometry of the exterior aircraft light 2, in particular on the distance d between the light source 6 and the pivot axis P of the shutter arrangement 10.

In alternative embodiments, which are not depicted in the figures, the at least one light source 6 may be arranged on the pivot axis P of the shutter arrangement 10. In such a configuration, the opening angle β of the light outputs 20*a*, 20*b* emitted by the exterior aircraft light 2 will be identical with the opening angle γ of the opening 18 of the shutter arrangement 10.

In further embodiments, which are also not depicted in the figures, the at least one light source 6 may be arranged below the pivot axis P of the shutter arrangement 10.

Figure 7A:
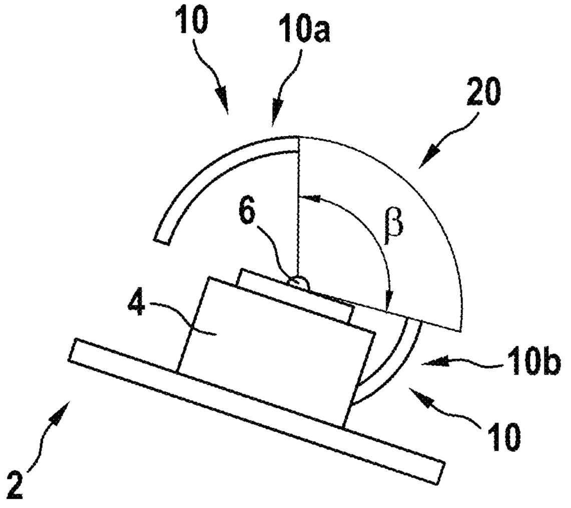
FIGS. 7A, 7B, and 7C depict an exterior aircraft light according to an exemplary embodiment of the invention comprising a shutter arrangement including two shutter elements, which are movable independently of each other.
Figure 7B:
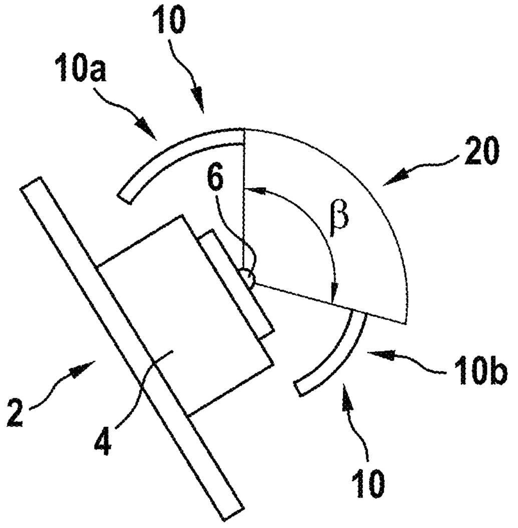
Figure 7C:
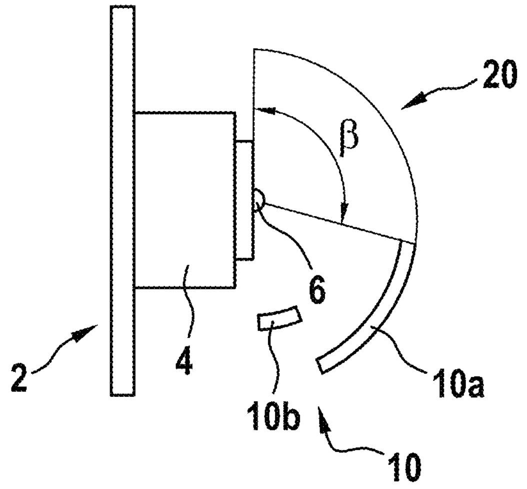

FIGS. 7A to 7C schematically illustrate an exterior aircraft light 2 according to an exemplary embodiment of the invention, in which the shutter arrangement 10 comprises two shutter elements 10*a*, 10*b*, which are movable with respect to the base structure 4 of the exterior aircraft light 2 independently of each other.

FIGS. 7A to 7C illustrate that, by moving the shutter elements 10*a*, 10*b* independently of each other into appropriate positions, highly similar/identical "global" light outputs 20, i.e. light outputs, which are highly similar/identical, when viewed from outside the aircraft 100, may be generated with different spatial orientations of the exterior aircraft light 2.

An exterior aircraft light 2, as it is depicted in FIGS. 7A to 7C, may provide highly similar/identical "global" light outputs 20, even when it is mounted to an aircraft 100, for example to a wing 104*a*, 104*b* of an aircraft 100, in different spatial orientations, as schematically depicted in FIGS. 3A and 3B.

An exterior aircraft light 2, in which the shutter elements 10*a*, 10*b* of the shutter arrangement 10 are movable independently of each other, further allows for generating light outputs 20 having different opening angles β. Thus, a shutter arrangement 10, in which the shutter elements 10*a*, 10*b* are movable independently of each other, provides more flexibility in generating the light output 20 of the exterior aircraft light 2 than a shutter arrangement 10, in which the shutter elements 10*a*, 10*b* are fixed with respect to each other.

A shutter arrangement 10 comprising individually movable shutter elements 10*a*, 10*b* may further allow for optimizing the thermal path, which is provided for dissipating the heat generated by the at least one light source 6 in operation.

Figure 8:
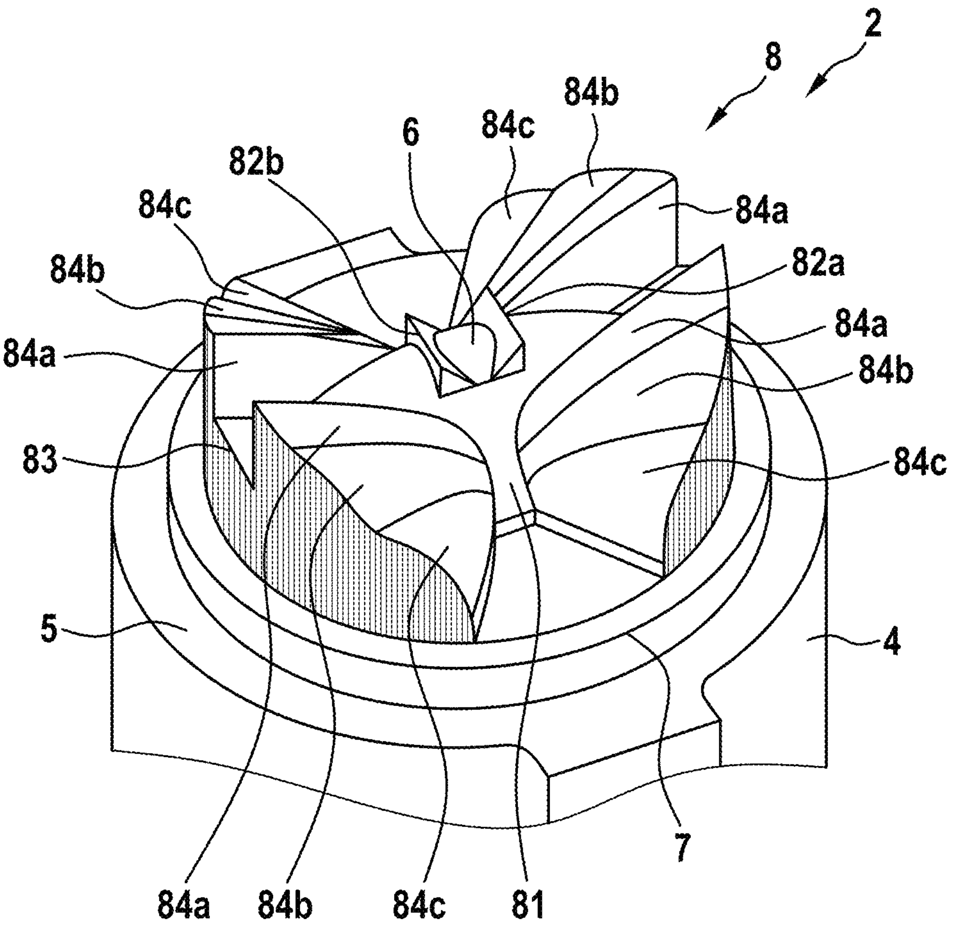
FIG. 8 show a perspective view of the optical system of an exterior aircraft light according to an exemplary embodiment of the invention.

FIG. 8 depicts a perspective view of an exterior aircraft light 2, as it is depicted in FIGS. 5, 6A, and 6B, without the shutter arrangement 10, allowing for an unobstructed view onto the optical system 8 of the exterior aircraft light 2.

In an embodiment, the optical system 8 may, at least partly, be formed of silicone and/or may be formed by over-molding.

The optical system 8 is configured for generating a preliminary light output from the light emitted by the light source 6, such that the preliminary light output allows for generating different light outputs 20*a*, 20*b* of the exterior aircraft light 2 by moving the shutter arrangement 10 between different positions, wherein each of the potential light outputs 20*a*, 20*b*, emitted by the exterior aircraft light 2, fulfills the FAR-requirements for the respective type of exterior aircraft light 2.

The preliminary light output, which is generated by the optical system 8, has a preliminary opening angle in a plane that is oriented perpendicular to the pivot axis P of the shutter arrangement 10 and that is identical with or parallel to the cutting plane of FIGS. 6A and 6B. When the exterior aircraft light 2 is mounted to an aircraft 100, the pivot axis P of the shutter arrangement 10 is arranged basically vertically. In consequence, the plane, which is oriented perpendicular to the pivot axis P, is a substantially horizontal plane. Within said horizontal plane, the preliminary light output may have a preliminary opening angle of at least 180°.

The exemplary embodiment of the optical system 8, as depicted in FIG. 8, comprises a free form geometry 81 having the shape of a dome, covering and surrounding the at least one light source 6, which therefore is not visible in FIG. 8.

For providing two linear light outputs, which are emitted in two opposite directions, two linear geometries 82*a*, 82*b*, each having a basically triangular cross-section, are formed on top of the free form geometry 81.

Further linear geometries 83, only one of which is visible in FIG. 8, are formed next to the dome-shaped free form geometry 81 below the two linear geometries 82*a*, 82*b*, respectively.

The optical system 8 further comprises a plurality of parabolic geometries 84*a*-84*c*, which are arranged adjacent to each other along the outer periphery of the dome-shaped free form geometry 81 for forming and providing additional light outputs.

The free form geometry 81, the linear geometries 82*a*, 82*b*, and the parabolic geometries 84*a*-84*c* may be formed from a transparent material, such as glass or another appropriate transparent synthetic material. The free form geometry 81, the linear geometries 82*a*, 82*b*, and the parabolic geometries 84*a*-84*c* may be formed from the same transparent material or from different transparent materials.

The free form geometry 81, the linear geometries 82*a*, 82*b*, and the parabolic geometries 84*a*-84*c* may in particular be formed of silicone.

The specific shapes of the various geometries 81, 82*a*, 82*b*, 83, 84*a*, 84*b*, 84*c* depend on the refractive index of the transparent material(s), on the light emission properties of the at least one light source 6, and on the desired preliminary light out-put, which is to be generated by the optical system 8.

Figure 9:
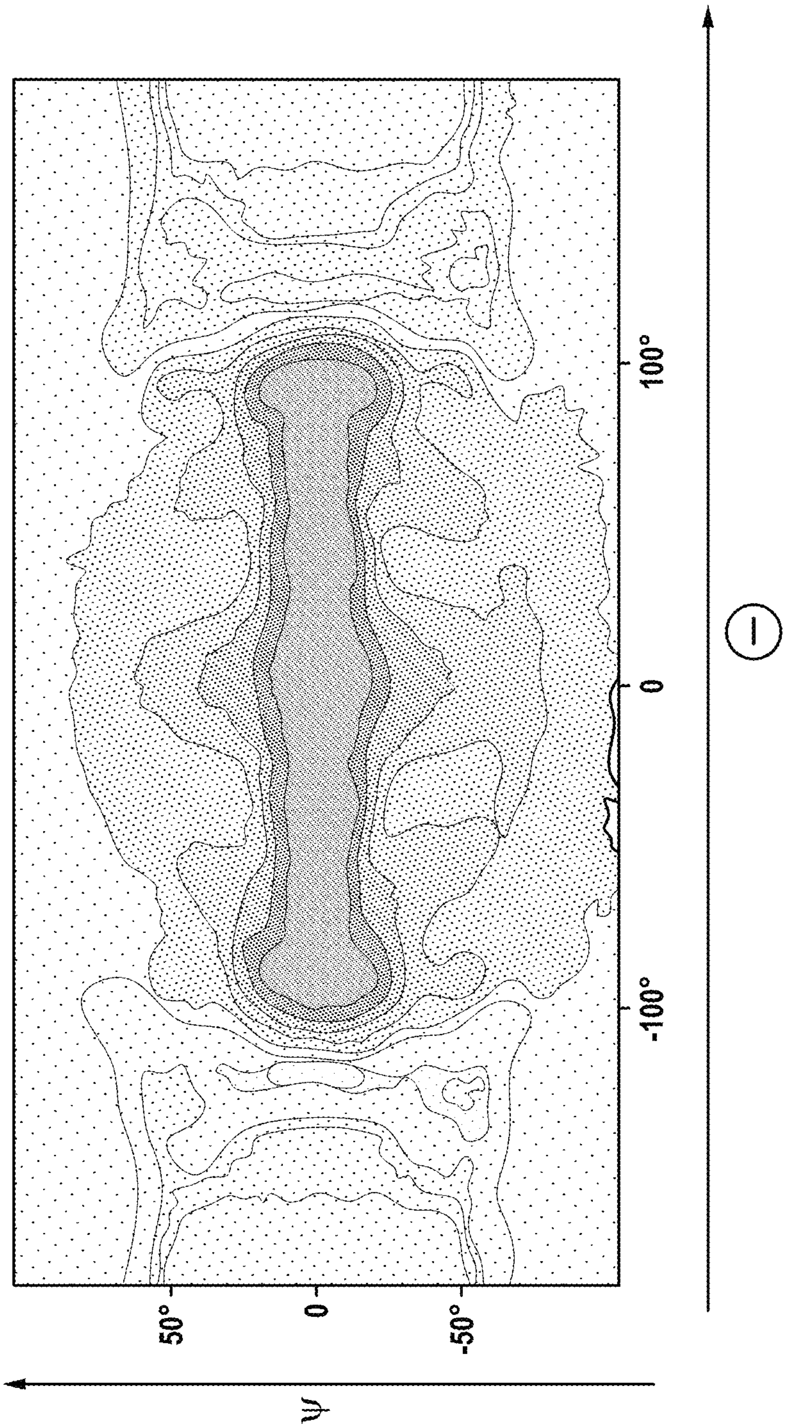
FIG. 9 depicts the intensity distribution of a preliminary light output of an exterior aircraft light according to an exemplary embodiment of the invention.

FIG. 9 illustrates the intensity distribution of an exemplary preliminary light output, which is generated by an optical system 8 of an exterior aircraft light 2 according to an exemplary embodiment of the invention. The intensity distribution is illustrated in the form of a heat map.

In FIG. 9, the angle Θ in the horizontal plane, which is oriented perpendicular to the pivot axis P of the shutter arrangement 10, is plotted on the horizontal axis, and the angle Ψ in a vertical plane, which is oriented perpendicular to the horizontal plane, is plotted on the vertical axis.

FIG. 9 shows that the preliminary light output has a high intensity I over a large horizontal angular range, in particular over a horizontal angular range in which the angle Θ is between −110° and +110°, and over a vertical angular range, in which the angle Ψ is between −20° and +20°. This range is suitable for being used for generating the light output 20, 20*a*, 20*b* of the exterior aircraft light 2 by blocking portions of the preliminary light output, which is generated by an optical system 8.

Figure 10:
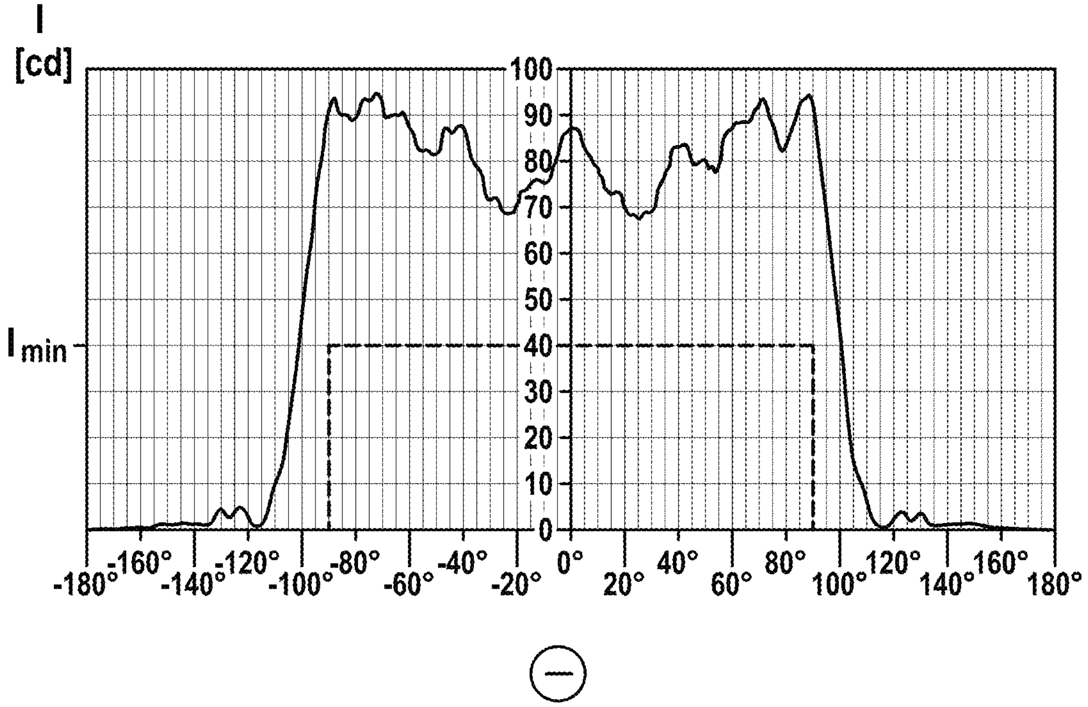
FIG. 10 shows the variation of the intensity of the preliminary light output of an exterior aircraft light according to an exemplary embodiment of the invention along the horizontal direction.

FIG. 10 comprises a plot showing the intensity I of the preliminary light output along a central vertical plane (Ψ=0) as a function of the angle Θ within the horizontal plane.

For being able to provide a navigation light output in any direction within a 180° range, the minimum intensity Imin of the light output, as required by the FAR provisions, is plotted as a dashed line. In other words, the dashed line of FIG. 10 indicates the highest FAR requirement for a navigation light output, extended over the full 180° range.

FIG. 10 shows that the intensity I of the preliminary light output, generated by an optical system 8 of an exterior aircraft light 2 according to an exemplary embodiment of the invention, is well above the minimum intensity Imin of the light output required by the FAR provisions for all horizontal angles Θ within the range of between 100° and +100°.

Although this is not shown explicitly in a diagram, the intensity I of the preliminary light output, generated by the optical system 8 of an exterior aircraft light 2 according to an exemplary embodiment of the invention, is well above the minimum intensity Imin of the light output required by the FAR provisions for all vertical angles Ψ in the range of between −90° and +90°.

In consequence, by partially blocking the preliminary light output, generated by the optical system 8, with the shutter arrangement 10, a light output 20, 20*a*, 20*b*, 206*a*, 206*b* that fulfills the provisions of the FAR may be generated for a plurality of positions of the shutter arrangement 10 with respect to the base structure 4.

It is pointed out again that the optical system 8 is an optional component. While such an optical system is a good way of providing a preliminary light output with a large horizontal angular range, other designs are possible as well. For example, wide angle light source arrangements may be used. Such wide angle light source arrangements may employ light sources that inherently have large opening angles. It is also possible that a plurality of light sources are arranged along an arcuate base structure for conveniently distributing light over a large horizontal angular range.

With reference to FIGS. 5A to 7C, an exterior aircraft light 2 according to an exemplary embodiment of the invention has been described, in which the light output 20, 20*a*, 20*b*, 206*a*, 206*b*, emitted by the exterior aircraft light 2, has an opening angle β1 of 110°. Such an exterior aircraft light 2 may, for example, be employed as a red or green forward navigation light 106*a*, 106*b*, as depicted in FIGS. 1 and 2.

By employing a shutter arrangement 10 with an opening 18 having a different opening angle γ, an exterior aircraft light 2 emitting a light output 20, 20*a*, 20*b*, 206*c* having a different opening angle β2, in particular having an opening angle β2 of 140°, may be provided. Such an exterior aircraft light 2 may, for example, be employed as a white tail navigation light 106*c*, as it is depicted in FIGS. 1 and 2.

An exterior aircraft light 2 according to an exemplary embodiment of the invention may also be equipped with a shutter arrangement 10 having an opening 18, which results in a light output 20, 20*a*, 20*b* of the exterior aircraft light 2 having an opening angle β of 120°. In combination with a suitable light source 6, such an exterior aircraft light 2 may be employed as a white strobe anti-collision light 118, as depicted in FIG. 1, or as a red beacon anti-collision light.

Depending on the desired application, the at least one light source 6 may have the desired color. It is also possible that the at least one light source 6 comprises a plurality of light sources of different colors. In this case, the desired color may be emitted by selectively activating a suitable one or a suitable subset of the plurality of light sources in operation.

In embodiments, in which the shutter elements 10*a*, 10*b* are movable independently of each other, as illustrated in FIGS. 7A to 7C, light outputs 20, 20*a*, 20*b*, 206*a*, 206*b*, 206*c* having different opening angles β1, β2 may be output by the same exterior aircraft light 2.

In consequence, employing a shutter arrangement 10 comprising individually movable shutter elements 10*a*, 10*b* provides a very flexible exterior aircraft light 2, which is able to produce a large number of different light outputs 20, 20*a*, 20*b*, 206*a*, 206*b*, 206*c*, so that it is adjustable to various different types of aircraft 100 and to various different mounting positions at the respective aircraft 100.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims

What is claimed is:

1. An exterior aircraft light, comprising:

a base structure;

at least one light source for emitting light providing a preliminary light output, wherein the at least one light source is arranged on the base structure; and a shutter arrangement for forming a light output of the exterior aircraft light by partially blocking the preliminary light output, the shutter arrangement coupled to the base structure via a pivoting mechanism and comprising:

a first pair of lateral connecting portions disposed on opposing sides of the base structure, a first arcuate shutter element extending between the first pair of lateral connection portions, a second pair of lateral connecting portions disposed on opposing sides of the base structure, a second arcuate shutter element extending between the second pair of lateral connection portions, wherein each lateral connecting portion of each of the first pair of lateral connecting portions and the second pair of lateral connecting portions defines a hole, and wherein each hole is disposed with respect to the base such that a common axis extends through a center of each hole such that the first arcuate shutter and the second arcuate shutter are configured to rotate about the common axis;

wherein the shutter arrangement is configured to block different portions of the preliminary light output for different pivoting positions of the shutter arrangement.

2. The exterior aircraft light according to claim 1, further comprising an optical system, which is arranged for forming the preliminary light output from the light emitted by the at least one light source.

3. The exterior aircraft light according to claim 2, wherein the optical system comprises a lens arrangement for forming the preliminary light output.

4. The exterior aircraft light according to claim 3, wherein the lens arrangement comprises a plurality of collimating lens elements.

5. The exterior aircraft light according to claim 4, wherein the preliminary light output has a preliminary opening angle of at least 180°.

6. The exterior aircraft light according to claim 1, wherein the shutter arrangement comprises a third arcuate shutter element.

7. The exterior aircraft light according to claim 1, wherein the first arcuate shutter element and the second arcuate shutter element have fixed relative positions with respect to each other and are jointly pivotable.

8. The exterior aircraft light according to claim 7, wherein the light output of the exterior aircraft light has an opening angle (β, β1, β2) of between 110° and 150° C., in particular an opening angle (β, β1, β2) of between 110° and 130°, between the plurality of shutter elements.

9. The exterior aircraft light according to claim 1, wherein the first arcuate shutter element and the second arcuate shutter element are pivotable independently of each other.

10. The exterior aircraft light according to claim 1, wherein the light output of the exterior aircraft light passes the shutter arrangement in between the first arcuate shutter element and the second arcuate shutter element.

11. The exterior aircraft light according to claim 1, wherein the first arcuate shutter element and the second arcuate shutter element each includes a visor-shaped shutter element.

12. The exterior aircraft light according to claim 1, wherein the first arcuate shutter element and the second arcuate shutter element are supported on a pivoting rod that extends through the base structure, or wherein the first arcuate shutter element and the second arcuate shutter element are supported by two hinge pins that are arranged on opposite sides of the base structure.

13. The exterior aircraft light according to claim 1, further comprising a fixing mechanism, which allows for fixing the shutter arrangement in position with respect to the base structure.

14. The exterior aircraft light according to claim 13, wherein the fixing mechanism comprises at least one of:

a ratching mechanism, including a first set of teeth and a second set of teeth, which are, at least partially, in engagement with each other, a magnetic fixing mechanism, a mechanic coupling mechanism comprising at least one of a bolt, a pin, and a screw, and an adhesive-based fixing mechanism.

15. The exterior aircraft light according to claim 1, wherein the exterior aircraft light is an aircraft navigation light for emitting a navigation light output having a horizontal opening angle (β1) of between 110° and 150°; or wherein the exterior aircraft light is a white strobe anti-collision light (118) for emitting a white strobe anti-collision light output having a horizontal opening angle (β2) of between 110° and 150°.

16. An aircraft comprising at least one exterior aircraft light according to claim 1 wherein the at least one exterior aircraft light is mounted to at least one of a fuselage of the aircraft, a wing of the aircraft, a wing tip of the aircraft or a tail portion of the fuselage of the aircraft.

17. A method of manufacturing an exterior aircraft light, comprising:

arranging at least one light source on a base structure for providing a preliminary light output from light emitted by the at least one light source in operation;

coupling a first arcuate shutter element to the base structure via a pivoting mechanism configured to pivot about an axis;

coupling a second arcuate shutter element to the base structure via the pivoting mechanism configured to pivot about the axis; and bringing the shutter arrangement into an operating position relative to the base structure via the pivoting mechanism, with the shutter arrangement blocking a portion of the preliminary light output in operation.

18. The method according to claim 17, further comprising fixing the shutter arrangement in the operating position.

19. The method according to claim 18, further comprising permanently fixing the shutter arrangement in the operating position.

20. The method according to claim 17, further comprising arranging an optical system over the at least one light source for forming the preliminary light output from the light emitted by the at least one light source.

* * * * *